United States Patent
Alonso et al.

(10) Patent No.: US 12,180,831 B2
(45) Date of Patent: Dec. 31, 2024

(54) WELLBORE TRAJECTORY SYSTEM

(71) Applicant: RS Energy Group Topco, Inc., Calgary (CA)

(72) Inventors: Livan B. Alonso, Wayne, PA (US); Erik Langenborg, Quakertown, PA (US); David Howard, Calgary (CA); Manuj Nikhanj, Calgary (CA)

(73) Assignee: RS Energy Group Topco, Inc., Calgary (CA)

( * ) Notice: Subject to any disclaimer, the term of this patent is extended or adjusted under 35 U.S.C. 154(b) by 711 days.

(21) Appl. No.: 16/688,268

(22) Filed: Nov. 19, 2019

(65) Prior Publication Data

US 2020/0157887 A1    May 21, 2020

Related U.S. Application Data

(60) Provisional application No. 62/769,237, filed on Nov. 19, 2018.

(51) Int. Cl.
    *E21B 43/30* (2006.01)
    *E21B 7/04* (2006.01)
    (Continued)

(52) U.S. Cl.
    CPC .............. *E21B 7/04* (2013.01); *E21B 43/30* (2013.01); *E21B 47/022* (2013.01); *G01V 1/282* (2013.01)

(58) Field of Classification Search
    CPC .......... E21B 7/04; E21B 43/30; E21B 47/022; G01V 1/282
    See application file for complete search history.

(56) References Cited

U.S. PATENT DOCUMENTS

2008/0091396 A1* 4/2008 Kennon .................. E21B 43/26
                                                                    703/10
2011/0172976 A1* 7/2011 Budiman ................ E21B 47/04
                                                                    703/2
(Continued)

FOREIGN PATENT DOCUMENTS

CN      107829719 A  *  3/2018
WO    2010/039317 A       4/2010
(Continued)

OTHER PUBLICATIONS

Elons et al. A Proposed Model for Predicting the Drilling Path Based on Hybrid Pso-Bp Neural Network SAI Comuting Conference, Jul. 2016 (Year: 2016).*
(Continued)

*Primary Examiner* — Rehana Perveen
*Assistant Examiner* — Cuong V Luu
(74) *Attorney, Agent, or Firm* — DLA Piper LLP (US)

(57) ABSTRACT

Embodiments disclosed herein generally relate to a method and a system to generate well trajectories. A computing device receives one or more parameters associated with a target well in a target location. The computing device receives two or more data points for the target well in the target location. The computing device generates a modified wellbore path based on the one or more parameters associated with a target well and the two or more data points via a trained wellbore prediction model. The computing device compares the modified wellbore path for the target well to one or more wellbore paths of one or more wells co-located with the target well in the target location. The computing device updates the modified wellbore path for the target well by adjusting one or more coordinates of the modified wellbore path based on the comparison. The computing (Continued)

device generates a three-dimensional model of the target location.

18 Claims, 12 Drawing Sheets

(51) Int. Cl.
*E21B 47/022* (2012.01)
*G01V 1/28* (2006.01)

(56) References Cited

U.S. PATENT DOCUMENTS

| | | | |
|---|---|---|---|
| 2014/0209300 A1* | 7/2014 | Tilke | E21B 47/00 702/6 |
| 2016/0102544 A1* | 4/2016 | Aklestad | E21B 43/305 175/45 |
| 2018/0045031 A1* | 2/2018 | Shaposhnikov | E21B 47/005 |
| 2020/0040719 A1* | 2/2020 | Maniar | G06N 20/00 |
| 2020/0109618 A1* | 4/2020 | Flanagan | E21B 7/10 |
| 2020/0149386 A1* | 5/2020 | Menand | E21B 45/00 |

FOREIGN PATENT DOCUMENTS

| | | | |
|---|---|---|---|
| WO | 2012/027020 A1 | 3/2012 | |
| WO | WO-2014146004 A2 * | 9/2014 | ........... E21B 43/267 |
| WO | 2016/168596 A1 | 10/2016 | |
| WO | 2016/168957 A1 | 10/2016 | |
| WO | 2017/180157 A1 | 10/2017 | |
| WO | 2018/067131 A1 | 4/2018 | |

OTHER PUBLICATIONS

Andersen, Øystein et al., "Standardizing Planning and Cooperation Across Departments and Organisations to Increase Efficiency and Decrease Repeated Mistakes", Society of Petroleum Engineers, Apr. 22, 2015, SPE-173838-MS, 9 pages.

Extended European Search Report from counterpart EP Application No. 19209997.6 dated Aug. 28, 2020.

Summons to Attend Oral Proceedings Pursuant to Rule 115(1) EPC dated Apr. 28, 2023, of counterpart European Patent Application No. 19 209 997.6.

Examination Report dated Apr. 4, 2024, of counterpart Canadian Patent Application No. 3,061,860.

* cited by examiner

WELLBORE TRAJECTORY SYSTEM

CROSS-REFERENCE TO RELATED APPLICATIONS

This application claims priority to U.S. Provisional Application Ser. No. 62/769,237, filed Nov. 19, 2018, which is hereby incorporated by reference in its entirety.

FIELD OF DISCLOSURE

The present disclosure generally relates to a method and a system to generate well trajectories.

BACKGROUND

Horizontal drilling has become a widespread practice that has become increasingly easier to justify. Horizontal drilling increases the contact area of a wellbore with the reservoir (i.e., a thin stratigraphic interval). An ideal drilling workflow conventionally requires collaboration between integrated team members including geologists, geophysicists, and engineers (e.g., wellsite, drilling, and completion) who work together to select the drilling target, surface and kickoff locations, and the optimal wellbore path, all designed to satisfy engineering and geological constraints.

SUMMARY

Embodiments disclosed herein generally relate to a method and a system to generate well trajectories. In one embodiment, a method is disclosed herein. The computing device receives one or more parameters associated with a target well in a target location. The computing device receives two or more data points for the target well in the target location. The computing device generates a modified wellbore path based on the one or more parameters associated with a target well and the two or more data points via a trained wellbore prediction model. The wellbore prediction model is trained via a machine learning module. The computing device compares the modified wellbore path for the target well to one or more wellbore paths of one or more wells co-located with the target well in the target location. The computing device updates the modified wellbore path for the target well by adjusting one or more coordinates of the modified wellbore path based on the comparison. The computing device generates a three-dimensional model of the target location. The three-dimensional model of the target location includes the one or more wellbore paths of the one or more wells co-located with the target well and the hypothetical wellbore path for the target well.

In another embodiment, a system is disclosed herein. The system includes a processor and a memory. The memory includes programming code stored thereon, which, when executed by the processor, performs an operation. The operation includes receiving one or more parameters associated with a target well in a target location. The operation includes receiving two or more data points for the target well in the target location. The operation includes generating a modified wellbore path based on the one or more parameters associated with a target well and the two or more data points via a trained wellbore prediction model. The wellbore prediction model is trained via a machine learning module. The operation includes comparing the modified wellbore path for the target well to one or more wellbore paths of one or more wells co-located with the target well in the target location. The operation includes updating the modified wellbore path for the target well by adjusting one or more coordinates of the modified wellbore path based on the comparison. The operation includes generating a three-dimensional model of the target location. The three-dimensional model of the target location includes the one or more wellbore paths of the one or more wells co-located with the target well and the hypothetical wellbore path for the target well.

In another embodiment, a non-transitory computer readable medium is disclosed herein. The non-transitory computer readable medium includes instructions stored thereon, which, when executed by a processor, cause the processor to perform a method. The operation includes receiving one or more parameters associated with a target well in a target location. The operation includes receiving two or more data points for the target well in the target location. The operation includes generating a modified wellbore path based on the one or more parameters associated with a target well and the two or more data points via a trained wellbore prediction model. The wellbore prediction model is trained via a machine learning module. The operation includes comparing the modified wellbore path for the target well to one or more wellbore paths of one or more wells co-located with the target well in the target location. The operation includes updating the modified wellbore path for the target well by adjusting one or more coordinates of the modified wellbore path based on the comparison. The operation includes generating a three-dimensional model of the target location. The three-dimensional model of the target location includes the one or more wellbore paths of the one or more wells co-located with the target well and the hypothetical wellbore path for the target well.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in some embodiment may be beneficially utilized on other embodiments without specific recitation.

DETAILED DESCRIPTION

Horizontal drilling has become a widespread practice that has become increasingly easier to justify. Horizontal drilling increases the contact area of a wellbore with the reservoir (i.e., a thin stratigraphic interval). An ideal drilling workflow conventionally requires collaboration between integrated team members including geologists, geophysicists, and engineers (e.g., wellsite, drilling, and completion) who work together to select the drilling target, surface and kickoff locations, and the optimal wellbore path, all designed to satisfy engineering and geological constraints.

During the drilling process, it is important that the drill stay positioned in the expected stratigraphic interval. Unfortunately, conventional drilling plans may be based on inaccurate pre-drilling geologic models. Engineers may use a process referred to as "geosteering" to continuously adjust the placement of the drill head in real-time to target the correct stratigraphic interval. The resulted wellbore path position in three-dimensional space is recorded by utilizing measurement-while-drilling (MWD) survey technology. Such trajectories are close to the original well design, but variations may emerge due to unexpected engineering and geological challenges.

Conventional well-planning design begins with the identification of the target area of interest and the region to be drilled. A predesigned wellbore path may be positioned in the target zone based on one or more predetermined parameters. In some embodiments, such as when only sparse data is available for the drilling region, planning infill drilling presents a substantial technical challenge.

One or more techniques described herein are directed to a method and a system to generate well trajectories. In some embodiments, the one or more techniques disclosed herein provides a workflow that exploits the publicly available wellbore information to predict the most likely path of a given wellbore. Such publicly available information may include, for example, surface hole location, true vertical depth (TVD), lateral length, drilling operator, well operator, geological parameters, reservoir properties, petrophysical parameters, geophysical parameters, spacing data, and the like. The publicly available wellbore information may be used to train a wellbore prediction model. The wellbore prediction model may capture the knowledge and experience of the conventional teams of geologists, geophysicists, and engineers, and applies that knowledge and experience to generate a drilling program, optimized for production rates and/or ultimate recovery over a region of interest.

Further, the one or more techniques discussed herein do not require detailed drilling plan data, such as required by conventional systems. Rather, one or more techniques discussed herein may rely on historical wellbore paths and their limited publicly available information, by leveraging that information to build the wellbore prediction model.

Figure 1:
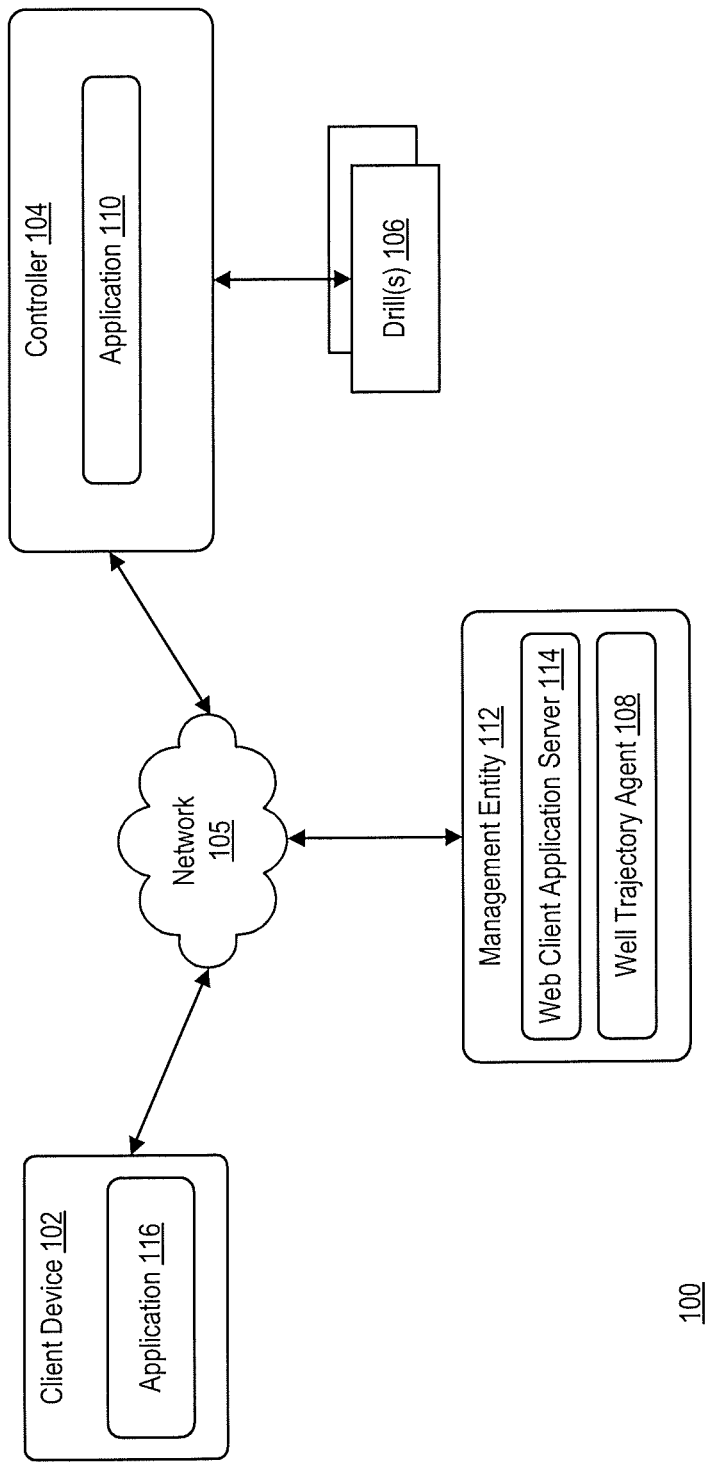
FIG. 1 is a block diagram illustrating an exemplary computing environment, according example embodiments.

FIG. 1 is a block diagram illustrating a computing environment 100, according to example embodiments. Computing environment 100 may include one or more client devices 102 and a controller 104 communicating via one or more networks 105. Client device 102 may be operated by a user. For example, client device 102 may be a mobile device, a tablet, a desktop computer, or any computing system having one or more of the capabilities described herein.

Client device 102 may include at least one application 116. Application 116 may be representative of a web browser that allows access to a website or a stand-alone application. Client device 102 may access application 116 to access functionality of management entity 112. Client device 102 may communicate over network 105 to request a webpage or other information, for example, from web client application server 114 of management entity 112. For example, client device 102 may be configured to execute application 112 to access one or more functionalities of management entity 112. The content that is displayed to client device 102 may be transmitted from web client application server 114 to client device 102, and subsequently processed by application 110 for display through a display 118 associated with client device 102.

Management entity 112 may be representative of one or more computer systems associated with an organization. Management entity 112 may include web client application server 114 and wellbore trajectory agent 108. Wellbore trajectory agent 108 may be formed from one or more software modules. The one or more software modules may be collections of instructions stored on a media (e.g., memory of client device 102) that represents a series of machine instructions (e.g., program code) that implements one or more algorithmic steps. Such machine instructions may be the actual computer code the processor of client device 102 interprets to implement the instructions, or, alternatively, may be a higher-level coding of the instructions that are interpreted to obtain the actual computer code. The one or more software modules may also include one or more hardware components. One or more aspects of the algorithm may be performed by the hardware components (e.g., circuitry) itself, rather as a result of an instruction.

Wellbore trajectory agent 108 may be configured to generate a drilling program for a wellbore. In some embodiments, wellbore trajectory agent 108 may generate the drilling program by utilizing a wellbore prediction model. Wellbore trajectory agent 108 may generate the wellbore prediction model using historical wellbore information associated with wellbore paths both in the region the wellbore is projected to be drilled and in unrelated regions. For example, wellbore trajectory agent 108 may input the historical wellbore information into a machine learning model to train the wellbore prediction model. Subsequent to generating the wellbore prediction model, in some embodiments, wellbore trajectory agent 108 may leverage the wellbore prediction model to determine placement of a future wellbore in a given region, as well as the path of the wellbore.

Controller 104 may be operated by a user. In some embodiments, controller 104 may be operated by a user distinct from the user operating client device 102. Controller 104 may be any general-purpose computer configured to perform the one or more functions disclosed herein. Controller 104 may be in communication with drill 106. For example, controller 104 may be configured to control the one or more processes of drill 106 during operation. Such processes may include, for example, the path drill 106 follows during the drilling process.

Controller 104 may include application 110. In some embodiments, application 110 may be a web browser based accessing an application hosted on a remote computing device. In some embodiments, application 110 may be installed on client device 104, and execute thereon. Application 110 may be configured to communicate with client device 102. For example, application 110 may be configured to execute a drilling program based off of input received from client device 102. In some embodiments, application 110 may receive instructions from client device 102 for the specific path of the wellbore.

Figure 2:
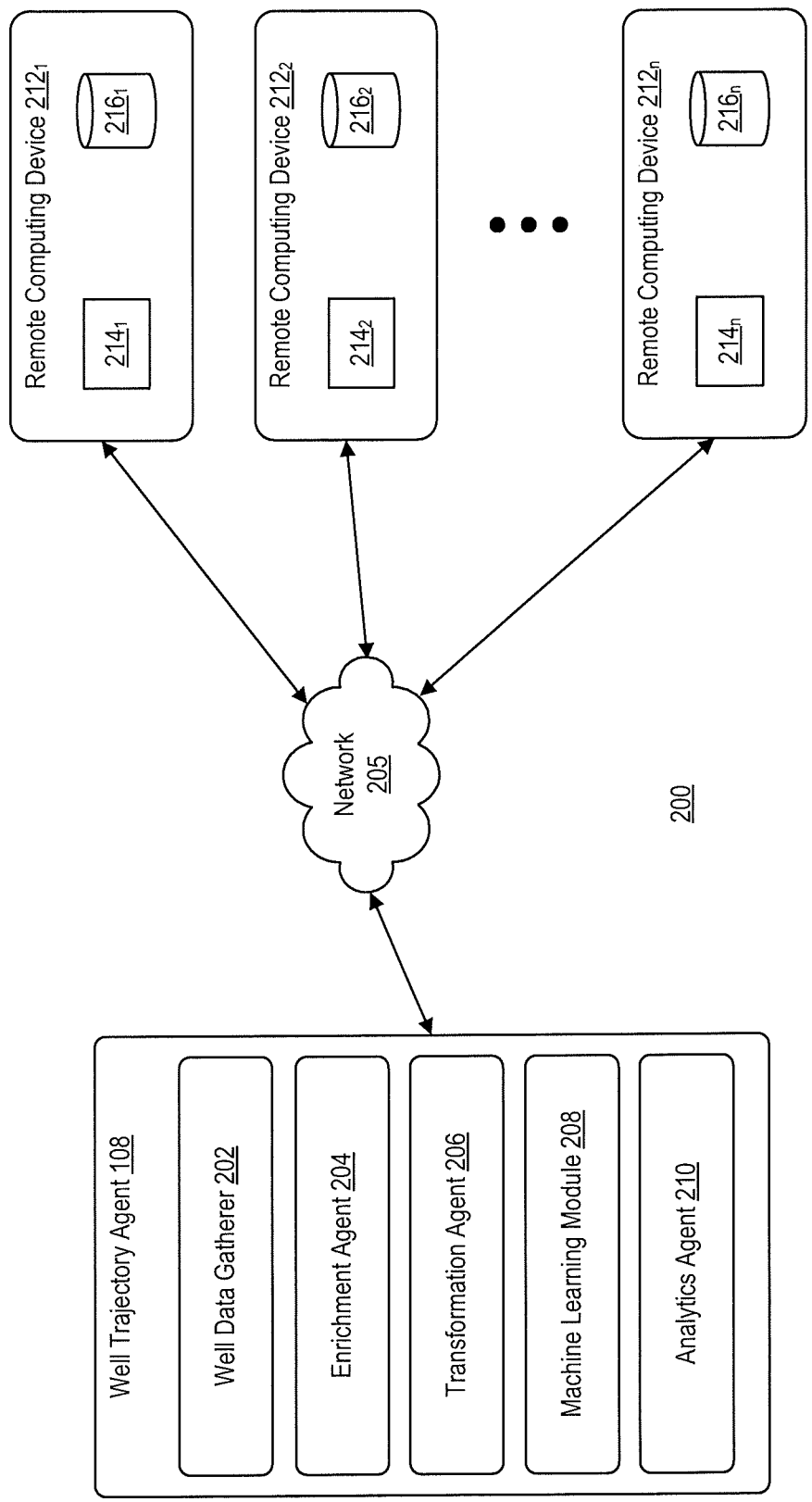
FIG. 2 is a block diagram illustrating exemplary components of the computing environment of FIG. 1 in more detail, according example embodiments.

FIG. 2 is a block diagram 200 illustrating one or more components of computing environment 100 in more detail. Block diagram 200 includes well trajectory agent 108 and one or more remote computing systems $212_1$-$212_n$ (generally "remote computing system 212") communicating over network 205.

Well trajectory agent 108 may include well data gatherer 202, enrichment agent 204, transformation agent 206, machine learning module 208, and analytics agent 210. Each of reference well data gatherer 202, enrichment agent 204, transformation agent 206, machine learning module 208, and analytics agent 210 may be formed from one or more software modules. The one or more software modules are collections of instructions stored on a media (e.g., memory of client device 102) that represents a series of machine instructions (e.g., program code) that implements one or more algorithmic steps. Such machine instructions may be the actual computer code the processor of client device 102 interprets to implement the instructions, or, alternatively, may be a higher level coding of the instructions that are interpreted to obtain the actual computer code. The one or more software modules may also include one or more hardware components. One or more aspects of the algorithm may be performed by the hardware components (e.g., circuitry) itself, rather as a result of an instruction.

Well data gatherer 202 may be configured to gather historical wellbore information associated with one or more wellbores. In some embodiments, well data gatherer 202 may be configured to gather historical wellbore information associated with one or more wellbores in an area associated with a target wellbore. In some embodiments, well data gatherer 202 may be configured to gather historical wellbore information associated with one or more wellbores in an area associated with a target wellbore, as well as historical wellbore information associated with one or more wellbores in an area unrelated to the target wellbore. For example, well data gatherer 202 may identify those wellbores that are in locations that are similar to the location containing the target wellbore, and retrieve historical wellbore information for wells in those locations. In another example, well data gatherer 202 may identify those wellbores that were generated by a similar operator.

Well data gatherer 202 may gather the historical wellbore information by communicating with one or more remote computing systems 212. For example, as illustrated in FIG. 2, well data gatherer 202 may communicate with remote computing system $212_1$, remote computing system $212_2$, and remote computing system $212_n$. Each remote computing system 212 may include a processor 214 (illustratively $214_1$, $214_2$, and $214_n$). Each processor 214 may be configured to execute one or more processes stored in a memory of each remote computing system 212. Each remote computing system 212 may further include a database 216 (illustratively $216_1$, $216_2$, and $216_n$). Each database 216 may include historical wellbore information associated with one or more wellbores. In some embodiments, each database 216 may correspond to a particular geographic location. In some embodiments, each database 216 may correspond to a given well operator. In some embodiments, historical wellbore information may be randomly dispersed among all databases 216 of remote computing devices 212. Upon receiving a request (or query) from well data gatherer 202, remote computing device 212 may transmit historical wellbore information associated with one or more wells to well trajectory agent 108 for further processing.

Enrichment agent 204 may be configured to analyze the historical wellbore information retrieved by well data gatherer 202. Enrichment agent 204 may be configured to analyze the historical wellbore information of each respective wellbore to identify whether the historical wellbore information associated with each wellbore is complete (i.e., not missing any data). In some embodiments, enrichment agent 204 may complete the historical wellbore information associated with a wellbore by imputing one or more missing data points. For example, enrichment agent 205 may identify at least two data points (e.g., head point and toe point of the wellbore). Enrichment agent 204 may then estimate a data point every pre-defined interval (e.g., every 50 feet). Enrichment agent 204 may continue to estimate data points until several hundred data points exist. This process may be done by plotting a geometric reference path (e.g., wellbores go down and then over). Enrichment agent 204 may then offset the geometric reference path based on surrounding data. For example, machine learning module 208 may be subsequently used to predict the offset based on surrounding data. In some embodiments, enrichment agent 204 may complete the historical wellbore information associated with a wellbore by integrating the historical wellbore information with other data sources. Such other data sources may include: neighbor well location data (e.g., head, toe, heel data points, full wellbore data points), geological data (e.g., region, play, surveyed geophysical information), time, operator (e.g., proppant, strategy), and well production.

Engineering data, geological data, reservoir properties data, petrophysical data, geophysical data gatherer 202 can include, but are not limited to:

A. Engineering Data

Reservoir fluid properties—viscosity, specific gravity, density, API, formation volume factor (gas, oil, water), composition, pressure-volume-temperature (PVT—bubble point pressure, dew point pressure, saturation, critical point, cricondentherm, cricondenbar), z factor, interfacial tension, wettability (oil wet, water wet, mixed, contact angle), hydrophobic, hydrophilic, gas (compressibility, deviation factor, retrograde, ideal), temperature, undersaturated, saturated, heating value.

Pressures—initial, virgin, original, surface, reservoir, flowing, stabilized, static, tubing, casing, bottom hole, gradients, shut in, over, normal, under, hydrostatic, depletion, pore (Pounds per square inch, pascals).

Well—vertical, horizontal, slant, lateral, leg, whipstock, infill, producer, injector, disposal, inactive, drilled but uncompleted (DUC), standing, abandoned, service, offset, orientation, wildcat, exploration, development.

Production rates/flow—oil, gas, water, natural gas liquids, ethane, propane, butane, condensate, marketable, residual, sand, steam, stabilized, slugging, phase flow (single, two, three, multiple).

Ratios: gas-oil, oil-water, water cut, oil cut, gas-water, steam-oil, liquid cut.

Yields: natural gas liquids per barrel, barrels of condensate per million cubic feet gas, surface loss, shrinkage, choke, bulk solids and water.

Absolute open flow potential, flow regime (steady-state, unsteady-state, pseudosteady-state, radial, linear, boundary), productivity index, deliverability, drawdown test, inflow performance test/relationship, pressure transient test or analysis, initial production test, 24 hour test, inflow test, drill stem test, fall off test, flowback test, formation damage, skin, fines, interference, non-Darcy flow, Darcy flow, simulation, pressure-squared, psuedopressure, peak rate, wellbore (fillup, storage).

Primary reservoir drive mechanism or displacement—aquifer, water influx, water drive, solution gas, gas cap, gravity, depletion, dissolved gas, volumetric, expansion.

Secondary and tertiary floods or displacement—enhanced (oil) recovery, improved (oil) recovery, cycling, pressure maintenance.

Injected materials for secondary or tertiary floods—water, miscible, surfactant, alkaline, polymer, gas, nitrogen, fire, in-situ combustion, steam, carbon dioxide, immiscible, vapour (VAPEX), water alternating gas.

Injector(s) and producer(s) configurations for secondary or tertiary floods—pattern, spot (five, nine, inverted, staggered, irregular), line, huff and puff, steam assisted gravity drainage, toe to heel air injection, off pattern.

Breakthrough, viscous fingering, gravity (over ride, under ride, segregation), mobility ratio, stability, coning (gas, water), gas solubility, hysteresis, imbibition, bank, osmotic, plugging.

Decline curve—decline rate, exponential, b factor, Arps, (super) hyperbolic, harmonic, terminal decline rate.

Type curve.

Material balance, volumetric.

Efficiencies—sweep, displacement, areal, vertical, conformance factor, volumetric.

Depth—measured, true vertical, landing, Kelly bushing, ground, casing flange, mid-point.

B. Rock and Fluid Properties That Control Flow and Reserves

Porosity—effective, gross, net, organic, inorganic, matrix, micro, fracture, void space, secondary, vesicular, vugular, moldic, wormhole.

Permeability (absolute, relative, directional, matrix).

Saturations (water, gas, oil, critical, residual, irreducible, end point, connate).

Area, spacing, vintage, lease, drill spacing unit, drainage area, acreage, hectares, feet, meters, property, compartmentalization, multiphase, play.

Thickness (gross, net).

Volume—bulk, hydrocarbon pore.

Capillary pressure, phase, transition zone.

Compressibility (rock and fluid).

Pores, pore throats, pore throat sizes, tortuosity.

Closure height.

Reserves—producing, proved, probable, possible, contingent, resource, economic, in-place, original, remaining, recovered, undeveloped, estimated ultimate recovery.

Recovery factor.

Acidic, alkali, neutral.

C. Geological Terms

Tectonics, plates, sea, ocean, land, climate, mountain, orogeny, massive, thin, isostasy, isostatic rebound, magnetic, metamorphic, sedimentary, igneous, soft rock, mantle, core, seawater, atmosphere, volcano, tide, terrestrial, uniformitarianism.

Latitude, longitude, Universal Transverse Mercator.

Basin—rift (horst, graben), passive margin, trench (accretionary wedge), forearc, foreland, strike-slip, intracratonic, epicratonic.

Geological Age—Precambrian, Palezoic (Cambrian, Ordovician, Silurian, Devonian, Mississippian, Pennsylvanian, Permian), Mesozoic (Triassic, Jurassic, Cretaceous), Cenozoic (Tertiary, Quaternary).

Layering, facies, thrust, fault, glaciation, zone, correlation, unit, formation, model, top, base, thickness, pay, erosion, weathering, relief, buildup, updip, downdip, dip, strike, deposit, interbedded, plane, subsurface, trend, block, group, frequency, interval, accumulation, Bouguer anomaly, cyclothem, weathering, matrix, subsea, eustasy, hydrothermal, impermeable, karst, lineament, horizon, plateau, platform, strata, subduction, subsalt, subsidence, geochronology, superposition, sedimentation.

Lithology—Grain size and texture—coarse, fine, very fine, density, Udden-Wentworth scale, arenaceous.

Lithology—Rock type and mineralogy—clastic, precipitates (limestone, dolomite, salt), organic (coal, black shale, chalk), breccia, pyroclastic.

Lithology—Small scale structures—cross-bedding, ripple marks, bioturbation.

Lithology—Depositional environment—petrology, deep marine, submarine, turbidite, fan, debris flow, marginal marine, slope, slump, contourite, lithoherm, shelf, reef, interior, peritidal, shallow marine, shoal, mounds, nearshore, coastal, delta, beach, lagoon, estuary, fluvial, lacustrine, swamp, marsh, aeolian, restricted, littoral, abyssal, bathyal, benthic, neritic, floor, margin, sabkha, pelagic, hemipelagic.

Lithology—Diagenetic Processes—lithification, dolomitization, cementation, compaction, thrusting, faulting, drape, transport, regression, transgression, progradation, en echelon, stylolite.

Sorting—homogenous, heterogeneous, skew, log normal.

Mineralogy—quartz, feldspar, calcite, siderite, dolomite, ankerite, pyrite, anhydrite, chlorite, mica, plagioclase, marcasite, halite, barite, anhydrite, gypsum, rhombs, celestite, authigenic, glauconite, bentonite, ash, tuff.

Rocks/Stones—silica, chert, coal, limestone, conglomerate, sandstone, mudstone, siltstone, claystone, shale, calcareous, source rock, fossiliferous, dolostone, diatomite, detrital, detrtitus, argillaceous, evaporate.

Clays—Smectite (montmorillonite, bentonite, gumbo), illite, kaolinite (serpentine), sloughing.

Fossils and animals—paleontology, bioclast (tentaculitids), oolitic, coquina, fossiliferous, pelagic, ostracods, gastropods, brachiopods, bacteria, foraminifera, radiolaria, shells, skeletons.

Stratigraphy—sequence, litho stratigraphy, bio stratigraphy, palynology, chronostratigraphy, bed, layer, layer cake, unconformity, conformable, laminated, planar, nodular, framboidal.

Parasequence—maximum flooding surface, systems tract, highstand, lowstand, sequence, stratigraphy, boundary.

Turbidite, beach, dune, bar, off-shore, anoxic, truncated, unconsolidated, consolidated, glacier.

Fault—thrust (over, under), normal, inverse, strike-slip, listric, reverse, sealing, secondary, foot wall, hanging wall, natural, induced, transform, wrench.

Transtension, transpression, flower structure.

Depth, datum, structure, area, thickness, closure, reservoir, surface, sea level, topographic, interface.

Contacts—oil water, gas oil, gas water.

Windows—gas, oil, volatile oil, condensate, rich condensate, lean condensate.

Bitumen, pyrobitumen.

Trap—anticline, syncline, pinchout, stratigraphic, structural, fault, unconformity, salt dome, diapir, hydrodynamic, basin-centered gas, halo, conventional, unconventional, tight sand, tight (gas or oil).

Cap rock, seal, breached.

D. Map Data

Isopach, isochron, velocity, isolith, kh, porosity, pay, kriging, base, show.

Cross-section, grid, dimension.
Model—earth, geological.
Bivariate analysis.
Prospect (location, target).
Chance of Success (chance of source, migration, reservoir, trap and seal).
Net pay, gross pay.

E. Petrophysics, Logging

Logs: Acoustic, (borehole compensated) sonic, density (compensated, bulk), neutron, resistivity, nuclear magnetic resonance, temperature, noise, (spectral) gamma ray, spontaneous potential, caliper, (dual) induction, conductivity, laterlog, lithological, micro (resistivity, laterolog, spherical), repeat formation tester, neutron (pulsed, thermal), tracer, sonolog, echo-meter, wireline.

Investigation (depth, radius).
Archie equation.
R (reflectivity coefficient), Phi (porosity).

F. Core Terms

Tight Rock Analysis—sample ID, depth, density—bulk or grain, effective porosity, saturation—water, gas, mobile oil or bound hydrocarbon, gas-filled porosity, bound clay water, pressure-decay permeability.

Grain density—measured, calculated, XRD.
Gamma Ray—Potassium (K), Thorium (Th), Uranium (U), spectroscopy.
Permeameter, desorption, diffusivity, Dean Stark, GRI crushed shale analysis, pyrolysis, chromatography.
Whole, plug, sidewall, routine.
Petrography.
X-ray diffraction (XRD), X-ray fluorescence (XRF).

G. Geochemical Terms

Biogenic, Thermogenic gas.
Pyrolysis.
Organic matter, kerogen, total organic carbon (TOC).
Maturity, Vitrinite reflectance, Tmax, VRo, Ro.
Kerogen Type—I, II, II and IV.
Coal (Lignite, bituminous, anthracite).
Maturity windows—kitchen, immature, oil, condensate, wet gas, gas, dry gas, overmature catagenesis, metagenesis, inert.
Plots—Van Krevelen, index (hydrogen or oxygen), remaining hydrocarbon potential, S1, S2, S3, production index.
Gas—adsorbed, absorbed, free.
Hydrolisis H. Geophysical Terms Seismic (2D, 3D, 4D).
Model, correlate, tie, acquisition, line, process, section.
Travel time, velocity (survey, correction), trace, interval transit time (delta-t), travel time
Synthetic wave trace, waveform, wavefront, wavelet, peak, trough, multiphase, spot (bright, dim), ray path, interval velocity, root mean square velocity.
Waves—compressional, shear, primary, wavelength, reflection, propagation, diffraction, refraction (Snell's law), transmission, noise, frequency, surface, Love, P-wave, Q-wave, S-wave, Rayleigh, ground roll.
Acoustic impedance, reflection coefficient, impedence contrast, polarity.
Data processing—common midpoint gather, migration, deconvolution, stacking, statics, correction.
Time slice, time to depth conversion.
Shot point, discontinuity.
Resolution, detectability, filter, signal to noise, channels, seismic tie, bandwidth, broad-band.
(Offset) vertical seismic profile.
Tomography, reflectivity, elastic.
Seismogram, seismograph, seismite.

I. Geomechanical Terms

Brittleness, Poisson's ratio, Elastic properties, Biot's constant, dynamic, ductile, Stoneley wave.
Modulus—Young's, bulk, shear.
Stress and or strain—longitudinal, hydrostatic, volumetric, shear, in-situ, minimum, maximum, orientation, azimuth, closure, triaxial, net confining, anisotropic, isotropic, yield, horizontal (maximum, minimum), vertical, effective, simple, normal, clamping.
Pore pressure (gradient).
Overburden.
Friction.
(Unconfined) Compressive strength.
Seismicity, induced seismicity, earthquake, temblor, tremor, magnitude (local, moment), Richter scale, shaking index, Modified Mercalli Intensity, peak (acceleration, velocity), felt seismicity, clusters, slip, rupture.
Mohr circle, stereonet.

Transformation agent 206 may be configured to transform the historical wellbore information retrieved by well data gatherer 202 from a first state into a second state. In some embodiments, transformation agent 206 may be configured to transform the historical wellbore information into a standardized format. In some embodiments, transformation agent 206 may be further configured to normalize the historical wellbore information in the standardized format. For example, transformation agent 206 may be configured to normalize the historical wellbore information into a pre-define range (e.g., [0,1]). Standardizing and normalizing the historical wellbore information aids in downstream processing of the historical wellbore information.

Machine learning module 208 may be configured to generate a wellbore prediction model. For example, the wellbore prediction model may be used to predict a placement of one or more wellbores. To train wellborn prediction model, machine learning module 208 may receive, as input, the historical wellbore information. Machine learning module 208 may implement one or more machine learning algorithms to train the wellbore prediction model. For example, machine learning module 208 may use one or more of a decision tree learning model, association rule learning model, artificial neural network model, deep learning model, inductive logic programming model, support vector machine model, clustering mode, Bayesian network model, reinforcement learning model, representational learning model, similarity and metric learning model, rule based machine learning model, and the like.

In some embodiments, training the wellbore prediction model may include machine learning module 208 segmenting each inputted wellbore into smaller sections. Based on the smaller sections, machine learning module 208 may learn the weights and statistical models to match to the known paths. In other words, machine learning module 208 may train wellbore prediction model by segmenting the wellbore path into smaller segments, such that wellbore prediction model can more easily match portions of future target wells to known segments. Such segmenting trains the wellbore prediction model to be able to predict unseen examples.

In some embodiments, training the wellbore prediction model may include machine learning module 208 using a control point generation method. The method learns to predict one or more critical points (e.g., one to eight points) in the wellbore. From the predicted one or more critical points, machine learning module 208 may interpolate the remaining wellbore points. The control point generation module is able to quickly and easily train models to match these biases As such, the wellbore prediction model does not need to learn the infinite possible paths of a wellbore in three-dimensional space.

Analytics agent 210 may be configured to leverage the trained wellbore prediction model to predict a wellbore path of future target wells. For example, following the training of wellbore prediction model, well trajectory agent 108 may be implemented to predict the trajectory of a target wellbore path. Analytics agent 210 may receive one or more parameters to input to the trained wellbore prediction model to design new wellbore paths. Such parameters may include, for example, well locations, geological parameters, reservoir properties, petrophysical parameters and geophysical parameters, and historical data of wells in the same plot. In some embodiments, historical data may be predicted well production or profit. For example, analytics agent 210 leverage wellbore prediction model to generate one or more "phantom" wellbores. With the phantom wellbore placed in a targeted area, a state of the targeted area is measured (e.g., spacing, drainage volume, well density, etc.), and the desirability of the proposed field is computed. A proposed target area (with phantom wellbore) may be valued by its estimated ultimate recovery, estimated profit, or any desired metric. Leveraging this evaluation, analytics agent 210 may generate a decision process such as genetic algorithms or reinforcement learning techniques to drive the next step towards improving the targeted area. Such technique drives the placement, and thus, the value of well layouts in the targeted area.

Figure 3:
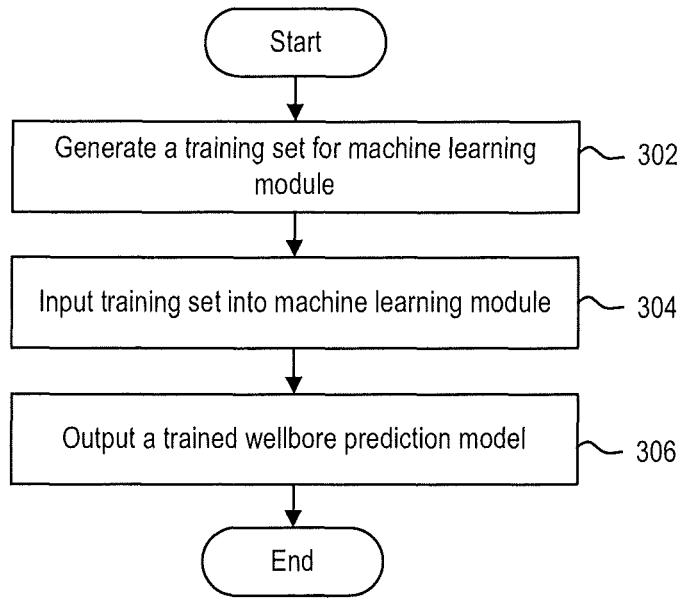
FIG. 3 is a flow diagram illustrating an exemplary method of generating a wellbore prediction model, according example embodiments.
Figure 4:
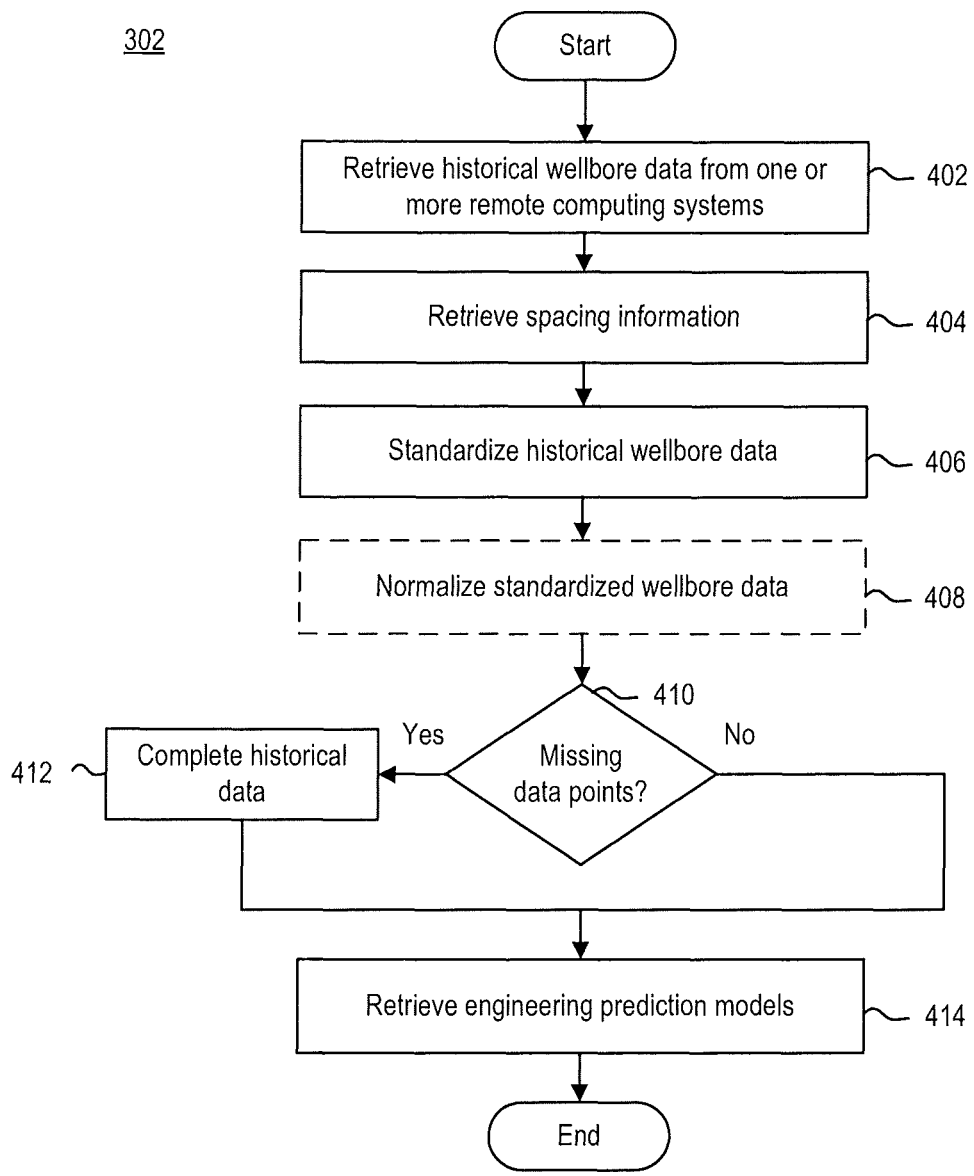
FIG. 4 is a flow diagram illustrating a step of the exemplary method of FIG. 3 in greater detail, according example embodiments.

FIG. 3 is a flow diagram illustrating an exemplary method 300 of generating a wellbore prediction model, according to example embodiments. Method 300 begins at step 302. At step 302, wellbore trajectory agent 108 may generate a training set for machine learning module 208. FIG. 4 is a flow diagram illustrating step 302 in greater detail. At step 402, wellbore trajectory agent 108 may retrieve historical wellbore data. For example, well data gatherer 202 may retrieve historical wellbore data from one or more remote computing system 212. In some embodiments, well data gatherer 202 may be configured to gather historical wellbore information associated with one or more wellbores in a predefined area, such as an area in which a target well will be placed. In some embodiments, well data gatherer 202 may be configured to gather historical wellbore information associated with one or more wellbores in a predefined area, as well as historical wellbore information associated with one or more wellbores in an area unrelated to the predefined area. Such historical wellbore data may include, but is not limited to, surface hole location, true vertical depth, lateral length, drilling operator, well operator, geological parameters, reservoir properties, petrophysical parameters, geophysical parameters, spacing data, and the like.

At step 404, wellbore trajectory agent 108 may retrieve spacing information for each wellbore in the historical wellbore data retrieved from one or more remote computing systems 212. Spacing information may include information related to the spacing of a given wellbore with respect to adjacent (or near-by) wellbores. Adjacent (or near-by) wellbores may be defined as those wellbores co-located in a given region with a target wellbore. Spacing information may be used to determine the impact on which adjacent wellbores have on a path of a target wellbore.

At step 406, wellbore trajectory agent 108 may standardize the historical wellbore data and the spacing information. For example, transformation agent 206 may standardize the historical wellbore data and the spacing information by transforming the data from an initial format to a standardized format. Because wellbore trajectory agent 108 may retrieve historical wellbore data and spacing information from a plurality of different sources (i.e., a plurality of remote computing devices 212), each set of retrieved historical wellbore data and spacing information may be in a different format (i.e., the initial format). To aid in more efficiently processing the information, transformation agent 206 may transform each set of information into a standard format.

In some embodiments, method 400 may further include step 408. At step 408, wellbore trajectory agent 108 may normalize the historical wellbore data and spacing information. For example, transformation agent 206 may normalize the standardized historical wellbore data and spacing information into a predefined range (e.g., [0,1]).

At step 410, wellbore trajectory agent 108 may determine if historical wellbore data for a given wellbore does not include complete information. For example, enrichment agent 204 may scan historical data associated with each wellbore to identify whether any wellbore includes historical data that is incomplete. If at step 410, wellbore trajectory agent 108 determines that historical wellbore data for a given wellbore does not include complete information, then at step 412, wellbore trajectory agent 108 completes the previously incomplete historical wellbore data. In some embodiments, completing the historical wellbore data may include inputting data into the historical wellbore data. In some embodiments, completing the historical wellbore data may include integrating the incomplete historical wellbore data with additional data sources.

If, however, at step 410, wellbore trajectory agent 108 may determine that historical wellbore data for each wellbore is complete, then method 400 proceeds to step 414. At step 414, wellbore trajectory agent 108 may retrieve a geometric prediction model for each wellbore in the historical wellbore data. The geometric prediction model may include, for example, a computer-generated model that was generated prior to the drilling process. The geometric prediction model represents a conventional approach to predicting wellbore paths. In some embodiments, if an geometric prediction model does not exist for all wellbores in the historical wellbore data, wellbore trajectory agent 108 may generate the geometric prediction model. Collectively, one or more of the historical wellbore data, the geometric prediction models, and the spacing information may be referred to as the training set for machine learning module 208.

Referring back to FIG. 3, after wellbore trajectory agent 108 generates a training data set for machine learning module 208, at step 304, wellbore trajectory agent 108 may train a wellbore prediction model by inputting the training data set into machine learning module 208.

Machine learning module 208 may implement one or more machine learning algorithms to train the wellbore prediction model. Training the wellbore prediction model may include determining how the actual wellbore path (i.e., the historical wellbore information) for a target wellbore differs from the geometric prediction information for the target wellbore. Such determination may be based on, for example, spacing from adjacent (or near-by) wellbores, surface hole location, bottom hole location, drilling operator, well operator, geological parameters, reservoir properties, petrophysical parameters, geophysical parameters, and the like.

In some embodiments, machine learning module 208 may train the wellbore prediction model at a more granular level. For example, training the wellbore prediction model may include machine learning module 208 segmenting each inputted wellbore into smaller sections. Based on the smaller sections, machine learning module 208 may learn the weights and statistical models to match to the known paths. In other words, machine learning module 208 may train wellbore prediction model by segmenting the wellbore path into smaller segments, such that wellbore prediction model can more easily match portions of future target wells to known segments.

At step 306, wellbore trajectory agent 108 may output a trained wellbore prediction model. For example, after inputting training data set into machine learning module 208, machine learning module 208 may output a wellbore prediction model that includes one or more trained weights that may be applied to future wellbore information to predict a wellbore path.

Figure 5:
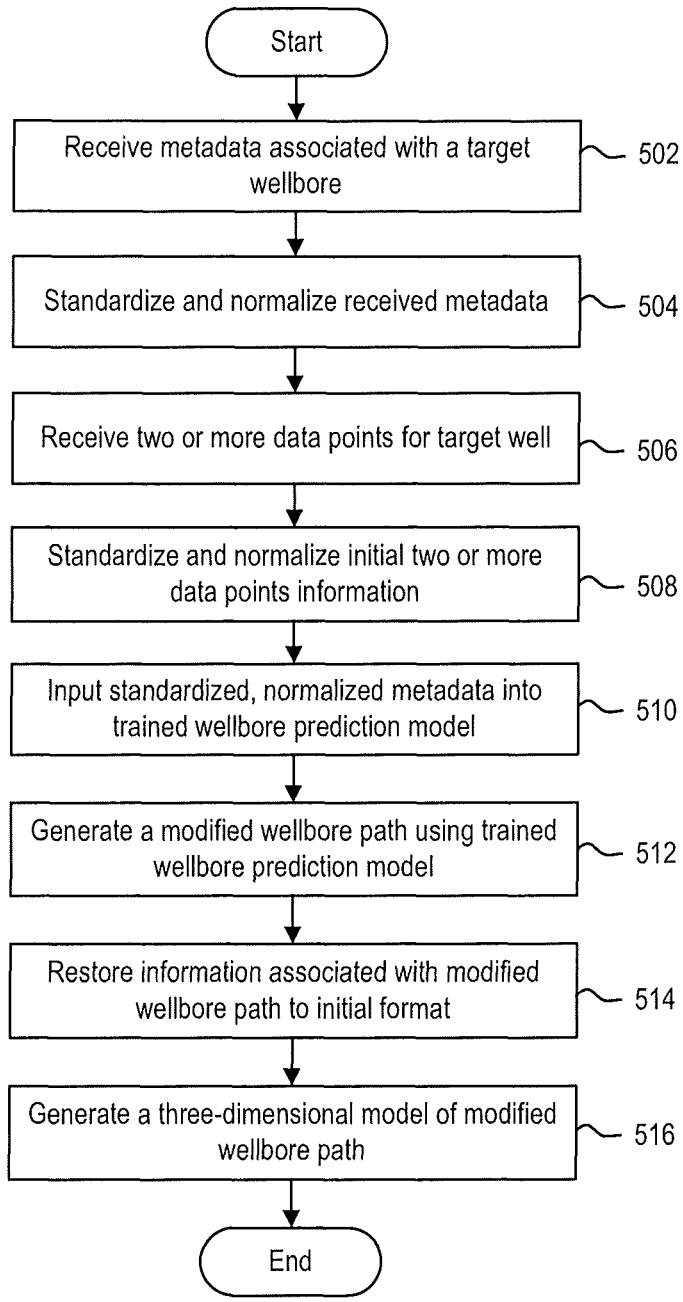
FIG. 5 is a flow diagram illustrating an exemplary method of generating a three-dimensional model of a wellbore, according example embodiments.

FIG. 5 is a flow diagram illustrating an exemplary method 500 of generating a three-dimensional model of a wellbore, according to example embodiments. Method 500 begins at step 502. At step 502, well trajectory agent 108 may receive metadata associated with a target wellbore. Such metadata may include, for example, one or more of a desired bottom hole placement, a desired top hole placement, a desired depth, a drilling operator, a location in which the target wellbore is to be located, one or more geological parameters, reservoir properties, petrophysical parameters and geophysical parameters associated with the location, and spacing information of wellbores co-located with the target wellbore. In some embodiments, well trajectory agent 108 may receive incomplete path data for a target well in a target area. For example, well trajectory agent 108 may receive incomplete path data for the target well.

At step 504, well trajectory agent 108 may standardize and normalize the received metadata associated with the target wellbore. With respect to numerical information associated with the metadata (e.g., bottom hole placement coordinates, top hole placement coordinates, true vertical depth, location coordinates, spacing information, and the like), transformation agent 206 may standardize this information by transforming the data from an initial format to a standardized format. Transformation agent 206 may further normalize the standardized sets of information (i.e., historical wellbore data, geometric prediction information, and spacing information). For example, transformation agent 206 may normalize the numerical metadata into a predefined range (e.g., [0,1]). With respect to non-numerical information associated with the metadata (e.g., drilling operator, geological parameters, reservoir properties, petrophysical parameters, geophysical parameters, and the like), to standardize this information, transformation agent 206 may transform the data from an initial format (i.e., non-numerical format) to a standardized format (i.e., numerical format). For example, for a given drilling operator, transformation agent 206 may transform this information (e.g., drilling operator name) to a numerical value. Transformation agent 206 may further normalize the standardized sets of information (i.e., drilling operator, geological parameters, reservoir properties, petrophysical parameters, geophysical parameters, and the like) within a predefined range (e.g., [0,1]).

At step 506, well trajectory agent 108 may receive two or more data points for the target wellbore. For example, well trajectory agent 108 may receive a geometric prediction model of the target wellbore. At step 508, well trajectory agent 108 may standardize and normalize information in the two or more data points. For example, transformation agent 206 may standardize the data in the geometric prediction model from an initial format to a standardized formation. Transformation agent 206 may further normalize the standardized sets of information within a predefined range (e.g., [0,1]).

At step 510, well trajectory agent 108 may input the standardized, normalized metadata into the trained wellbore prediction model. In some embodiments, well trajectory agent 108 may further input the standardized, normalized sets of information associated with the two or more data points for the target wellbore.

At step 512, well trajectory agent 108 may generate a modified wellbore path using the trained wellbore prediction model. For example, machine learning module 208 may apply one or more weights to the two or more data points using the metadata associate with the target wellbore. In particular, machine learning module 208 may adjust the two or more data points based on information learned about certain parameters in the training process of the wellbore prediction model. Further, in some embodiments, well trajectory agent 108 may compare the two or more data points to adjacent wells in the target area. For example, analytics agent 210 may retrieve one or more wellbore paths from one or more wellbores in the target area in which target well is located. Analytics agent 210 may validate the accuracy of the wellbore prediction model by comparing locations along the two or more data points to the one or more wellbore paths of the one or more wellbores in the target area. By comparing data points along the two or more data points to those of the one or more wellbore paths, analytics agent 210 checks to see whether any point along the two or more data points is within a threshold distance from a point in the one or more wellbore paths. Being within the threshold distance, for example, may correspond to the two or more data points being too close to another wellbore path. For example, analytics agent 210 may determine that a point in the two or more data points overlaps with a point in another wellbore path. As such, the additional comparison step may serve as a further validation of the modified wellbore path.

At step 514, well trajectory agent 108 may restore the information associated with the modified wellbore path to the initial format. For example, transformation agent 206 may return the information associated with the modified wellbore path from a normalized format (e.g., [0,1]) to the original format. Further, transformation agent 206 may return the information associated with the modified wellbore path from the standardized format to the initial format. As such, the information associated with the modified wellbore path may be presented to the user in the format originally submitted by the user.

At step 516, well trajectory agent 108 may generate a three-dimensional model of the modified wellbore path. For example, analytics agent 210 may generate a three-dimensional model of the target area comprising one or more wellbore paths of additional wellbores in the target area, as well as the modified wellbore path. Such three-dimensional model may be displayed to an end-user for further manipulation.

Figure 6:
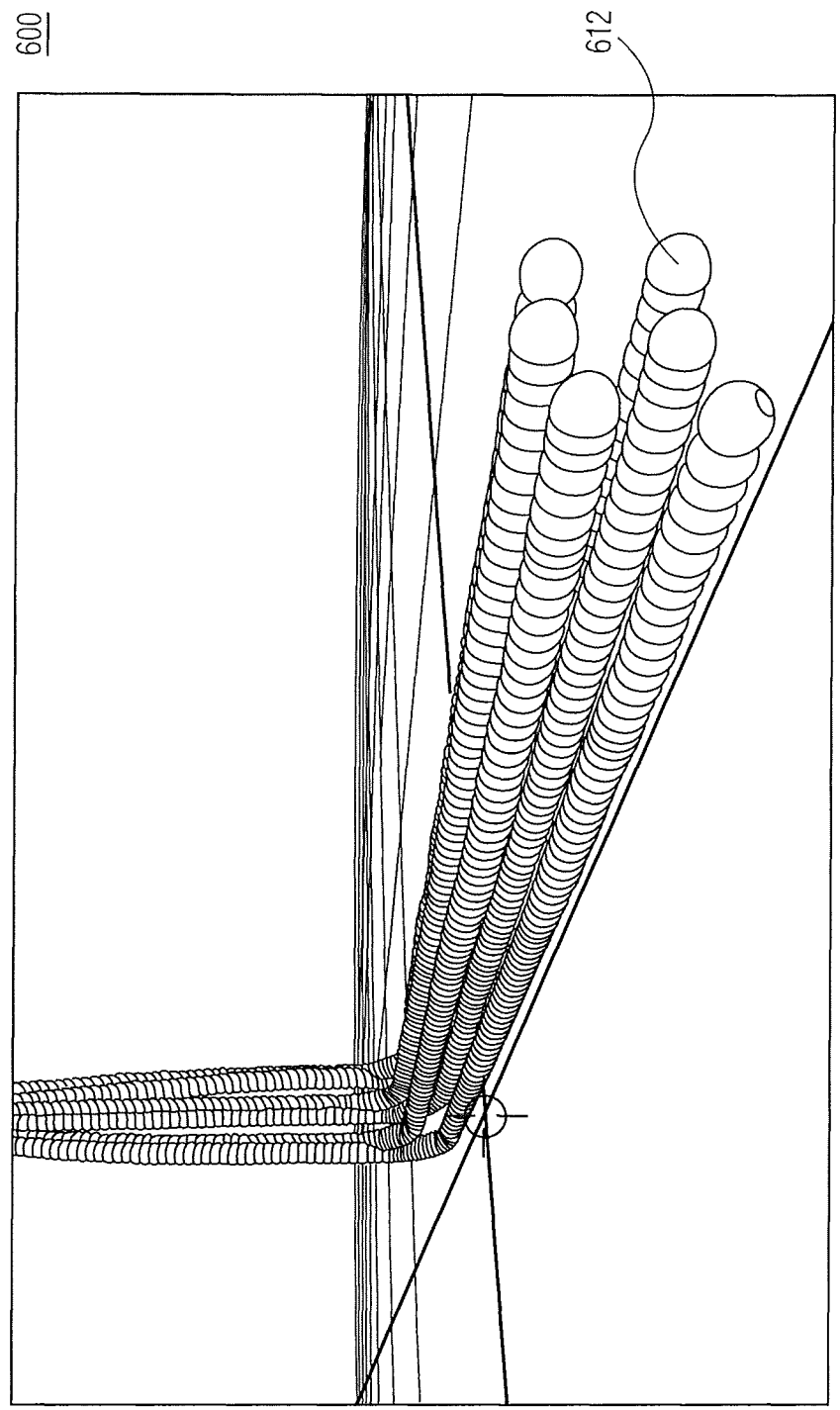
FIG. 6 is a block diagram illustrating a three-dimensional model of wellbores, according example embodiments.

FIG. 6 is a block diagram illustrating an exemplary three-dimensional model 600 generated by well trajectory agent 108, according to example embodiments. In a particular use case, well trajectory agent 108 may leverage method 500 to generate one or more wellbore paths in a target location. Traditionally, proper analysis of horizontal drilling is extremely sensitive to orientation and position of the wellbores. It is beneficial for end users to visually depict wellbore paths in a particular target location, because, for example, how wellbores are packed (or positioned) in various regions is important to discerning the interaction among the wellbores. By leveraging the methods disclosed herein, well trajectory agent 108 can generate model 600 that illustrates one or more wellbore paths 612, that aid the user in reliably estimating wellbore trajectories.

Figure 7:
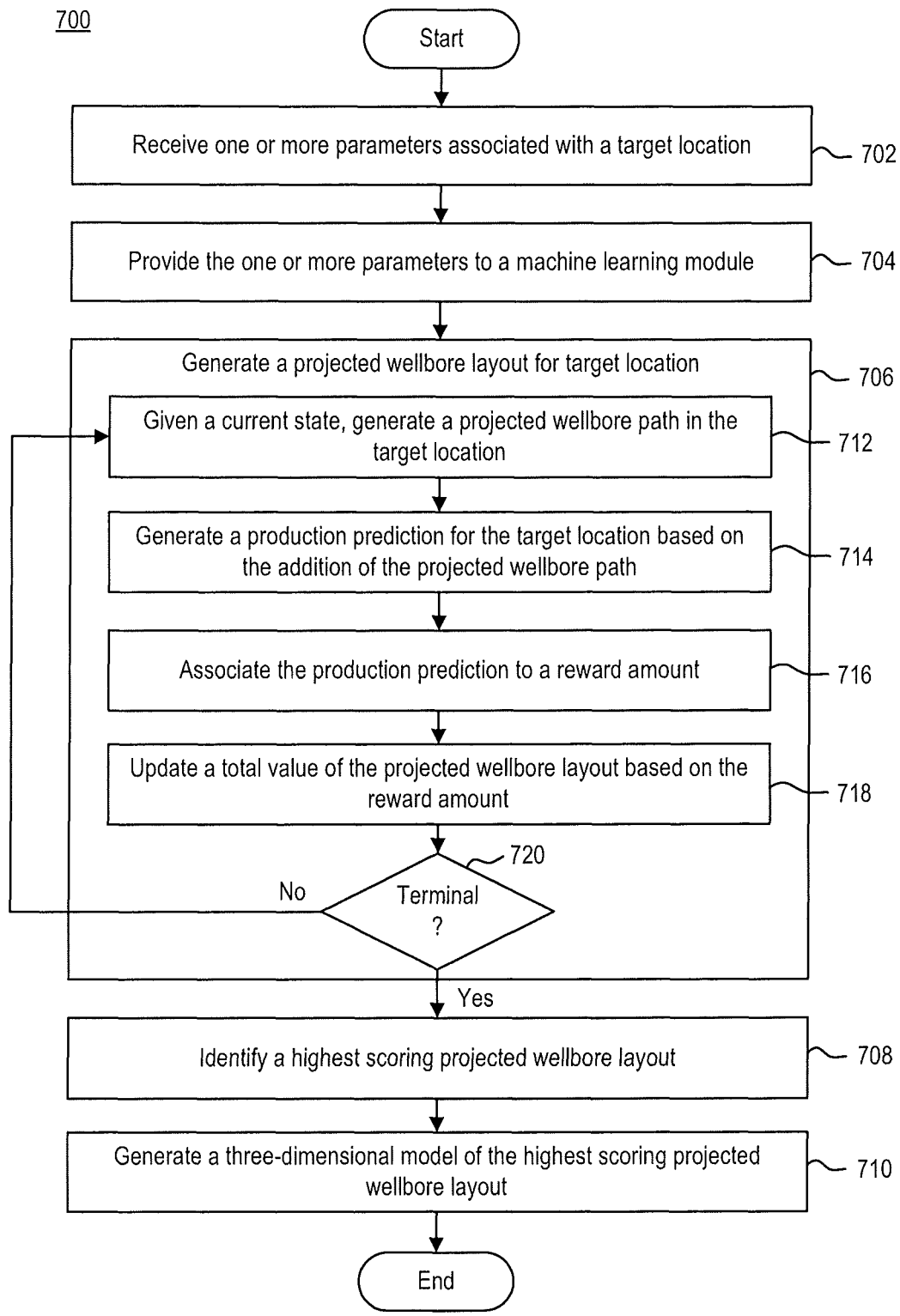
FIG. 7 is a flow diagram illustrating an exemplary method of generating a projected wellbore layout, according example embodiments.

FIG. 7 is a flow diagram illustrating an exemplary method 700 of generating a well placement optimization three-dimensional model, according to example embodiments. Method 700 begins at step 702. At step 702, well trajectory agent 108 may receive one or more parameters associated with a target location for one or more target wells. Well trajectory agent 108 may receive, for example, spacing of one or more existing wellbores in the target location, geological information of the target information, operator of each wellbore (existing or to-be-generated) in the target location, and performance of each existing wellbore in the target location.

At step 704, well trajectory agent 108 may provide the one or more parameters associated with the target location to a machine learning module (e.g., machine learning module 208). Machine learning module 208 may implement a machine learning model used to generate a projected wellbore layout for the target location based, in part, on the one or more parameters associated with the target location. In some embodiments, machine learning module 208 may implement a reinforcement value function to generate a projected wellbore path.

At step 706, well trajectory agent 108 may generate a projected wellbore layout for the target location. For example, machine learning module 208 may analyze the one or more inputs provided (i.e., the one or more parameters associated with the target location) to generate the projected wellbore layout. The projected wellbore layout may include one or more projected wellbore paths along with any pre-existing wellbores contained therein. Step 706 may include sub-steps 712-720.

At sub-step 712, given a current state of target location (e.g., during the first pass, this is an "initial state"), well trajectory agent 108 may generate a projected wellbore path for a first wellbore. For example, well trajectory agent 108 may generate the projected wellbore path for the first wellbore using method 500 discussed above in conjunction with FIG. 5.

At sub-step 714, well trajectory agent 108 may generate a production prediction for the target location based on the addition of the generated projected wellbore path to the target location. For example, the production prediction may include such metrics such as, but not limited to, wellbore spacing, drainage volume of all wellbores, density of each wellbore, and the like.

At step 716, well trajectory agent 108 may generate a reward amount based on the generated production prediction. For example, well trajectory agent 108 may provide feedback based on the addition of the projected wellbore path to the target location. Such reward amount may be calculated based on a metric predefined by the user. For example, such reward amount may be calculated based on, by example, the estimate ultimate recovery (EUR) of the target location with the addition of the projected wellbore path, the estimated profit generated by the target location with the addition of the projected wellbore path, the estimated revenue generated of the target location with the addition of the projected wellbore path, or any desired metric.

At step 718, well trajectory agent 108 may update a total value based on the generated reward amount. For example, in subsequent passes, well trajectory agent 108 may continue to add subsequent generated reward amounts to the total value.

At step 720, well trajectory agent 108 may determine whether the machine learning model has reached a terminal state. A terminal state may be defined as a state in which the reward amount generated in step 716 amounts to zero. In other words, the addition of the projected wellbore path to the target location has no effect on the metric predefined by the user (i.e., EUR, estimated profit, estimated revenue, etc.).

If, at step 720, well trajectory agent 108 determines that a terminal state has not been reached (i.e., the reward amount generated in step 716 is greater than zero), then method 700 reverts to step 712, and another projected wellbore path is generated an added to the projected wellbore layout.

If, however, at step 720, well trajectory agent 108 determines that the terminal state has been reached (i.e., the reward amount generated in step 716 is less than or equal to zero), then method 700 proceeds to step 708.

At step 708, well trajectory agent 108 may output the projected wellbore layout based on the one or more projected wellbore paths generated in step 706.

At step 710, well trajectory agent 108 may generate and output a three-dimensional model of the highest scoring projected wellbore layout.

For example, analytics agent 210 may generate a three-dimensional model of the target location comprising one or more wellbore paths of additional wellbores in the target area, as well as the one or more generated wellbore paths. Such three-dimensional model may be displayed to an end-user for further manipulation.

Figure 8:
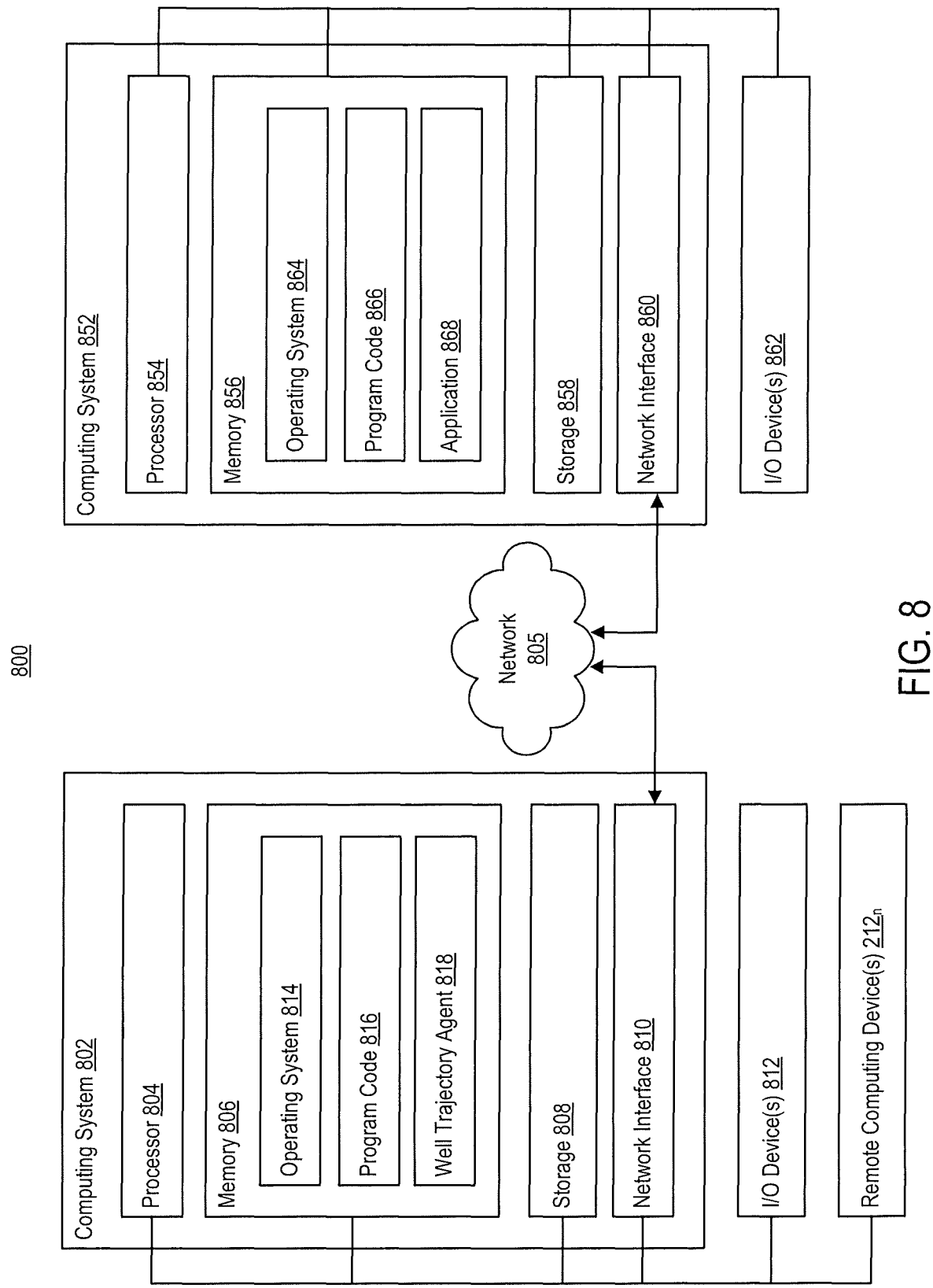
FIG. 8 is a block diagram illustrating an exemplary computing environment, according example embodiments.

FIG. 8 illustrates a computing environment 800, according to example embodiments. Computing environment 800 includes computing system 802 and computing system 852 communicating over network 805. Computing system 802 may be representative of management entity 112. Computing system 852 may be representative of client device 102.

Computing system 802 may include processor 804, memory 806, storage 808, and network interface 810. In some embodiments, computing system 802 may be coupled to one or more I/O devices 822 (e.g., keyboard, mouse, monitor, etc.).

Processor 804 retrieves one executes program code 816 (i.e., programming instructions) stored in memory 806, as well as stores and retrieves application data. Processor 804 may be representative of a single processor, multiple processors, a single processor having multiple processing cores, and the like. Network interface 810 may be any type of network communications enabling computing system 802 to communicate externally via network 805. For example, network interface 810 may allow computing system 802 to communicate with computing system 852.

Storage 808 may be, for example, a disk storage device. Although shown as a single unit, storage 808 may be a combination of fixed and/or removable storage devices, such as fixed disk drives, removable memory cards, optical storage, network attached storage (NAS), storage area network (SAN), and the like.

Memory 806 may include operating system 814, program code 816, and well trajectory agent 818. Program code 816 may be accessed by processor 804 for processing (i.e., executing program instructions). Program code 816 may include, for example, executable instructions configured to perform steps discussed above in conjunction with FIGS. 3-5 and 7. For example, program code 816 may include executable instructions for training a wellbore prediction model and using the wellbore prediction model to predict a wellbore path of existing and/or future wellbores. Wellbore trajectory agent 818 may be configured to generate a drilling program for a wellbore. In some embodiments, wellbore trajectory agent 818 may generate the drilling program by utilizing a wellbore prediction model. Wellbore trajectory agent 818 may generate the wellbore prediction model using historical wellbore information associated with wellbore paths both in the region the wellbore is projected to be drilled and in unrelated regions. For example, wellbore trajectory agent 718 may input the historical wellbore information into a machine learning model to train the wellbore prediction model. Subsequent to generating the wellbore prediction model, in some embodiments, wellbore trajectory agent 818 may leverage the wellbore prediction model to determine placement of a future wellbore in a given region, as well as the path of the wellbore.

Computing system 852 may include processor 854, memory 856, storage 858, and network interface 860. In some embodiments, computing system 852 may be coupled to one or more I/O devices 862.

Processor 854 retrieves one executes program code 866 (i.e., programming instructions) stored in memory 856, as well as stores and retrieves application data. Processor 854 may be representative of a single processor, multiple processors, a single processor having multiple processing cores, and the like. Network interface 860 may be any type of network communications enabling computing system 852 to communicate externally via network 805. For example, network interface 860 may allow computing system 852 to communicate with computing system 802.

Storage 858 may be, for example, a disk storage device. Although shown as a single unit, storage 858 may be a combination of fixed and/or removable storage devices, such as fixed disk drives, removable memory cards, optical storage, network attached storage (NAS), storage area network (SAN), and the like.

Memory 856 may include operating system 864, program code 866, and application 868. Program code 866 may be accessed by processor 854 for processing (i.e., executing program instructions). Program code 866 may include, for example, executable instructions configured to perform steps discussed above in conjunction with FIGS. 3-5 and 7.

Figure 9A:
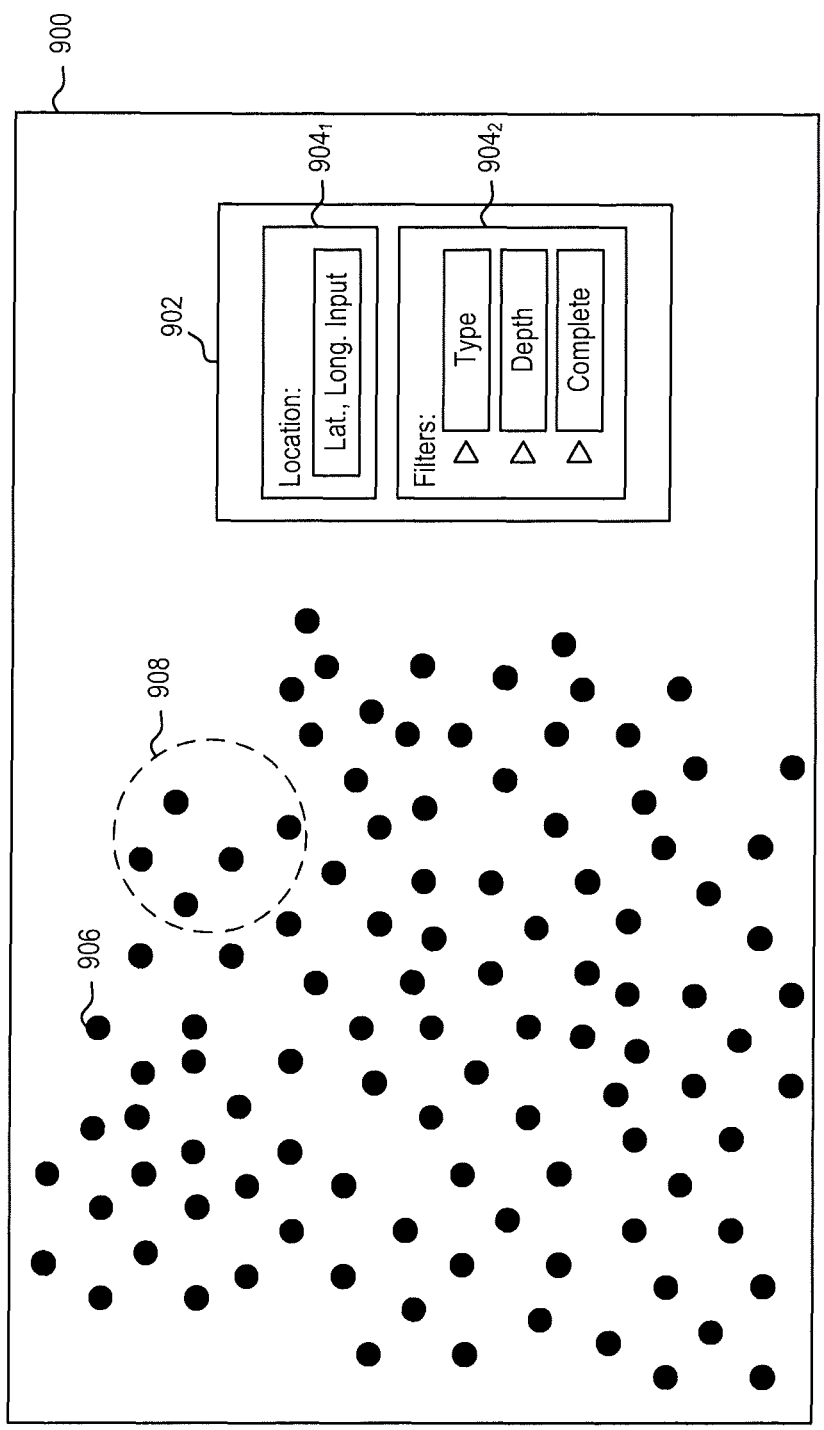
FIG. 9A is a block diagram illustrating an exemplary graphical user interface, according to example embodiments.

FIG. 9A is a block diagram illustrating a graphical user interface (GUI) 900, according to example embodiments. GUI 900 may be generated by wellbore trajectory agent 108 and transmitted to client device 102 for rendering. For example, a user of client device 102 may access a web portal hosted on management entity 106 to gain access to one or more functionalities of wellbore trajectory agent 108.

As shown, GUI 900 may allow end users to access wellbore information for a given location. GUI 900 may include a search panel 902. Search panel 902 may be configured to receive input related to a wellbore search. As illustrated, search panel 902 may have one or more fields $904_1$, $904_2$.

Field $904_1$ may receive, as input, location information. In some embodiments, field $904_1$ may prompt end users to provide longitudinal and latitudinal coordinates for a given location. In some embodiments, field $904_1$ may prompt end user to provide one or more of a street, city, and state address for a given location. When provided with location information via field $904_1$, well trajectory agent 108 may update GUI 900 to display one or more wellbores 906 located in the specified geographic area.

Field $904_2$ may allow end users to set one or more constraints on the search criteria for wellbores. For example, field $904_2$ may allow end users to constrain a wellbore search based on one or more of wellbore type, wellbore depth, completeness of the wellbore, and the like. Accordingly, after field $904_2$ receives one or more constraints specified by the user, well trajectory agent 108 may update GUI 900 to display one or more wellbores 906 that satisfy such criteria.

Generally, however, if there are no constraints set by the user, well trajectory agent 108 may generate GUI 900 such that GUI 900 includes all wellbores located in the specified geographic area. In some embodiments, GUI 900 may include both complete wellbore data and incomplete wellbore data. Incomplete wellbore data may include partial information for a given wellbore that is filled in using well trajectory agent 108 and the one or more operations discussed above in conjunction with FIGS. 4 and 5.

Figure 9B:
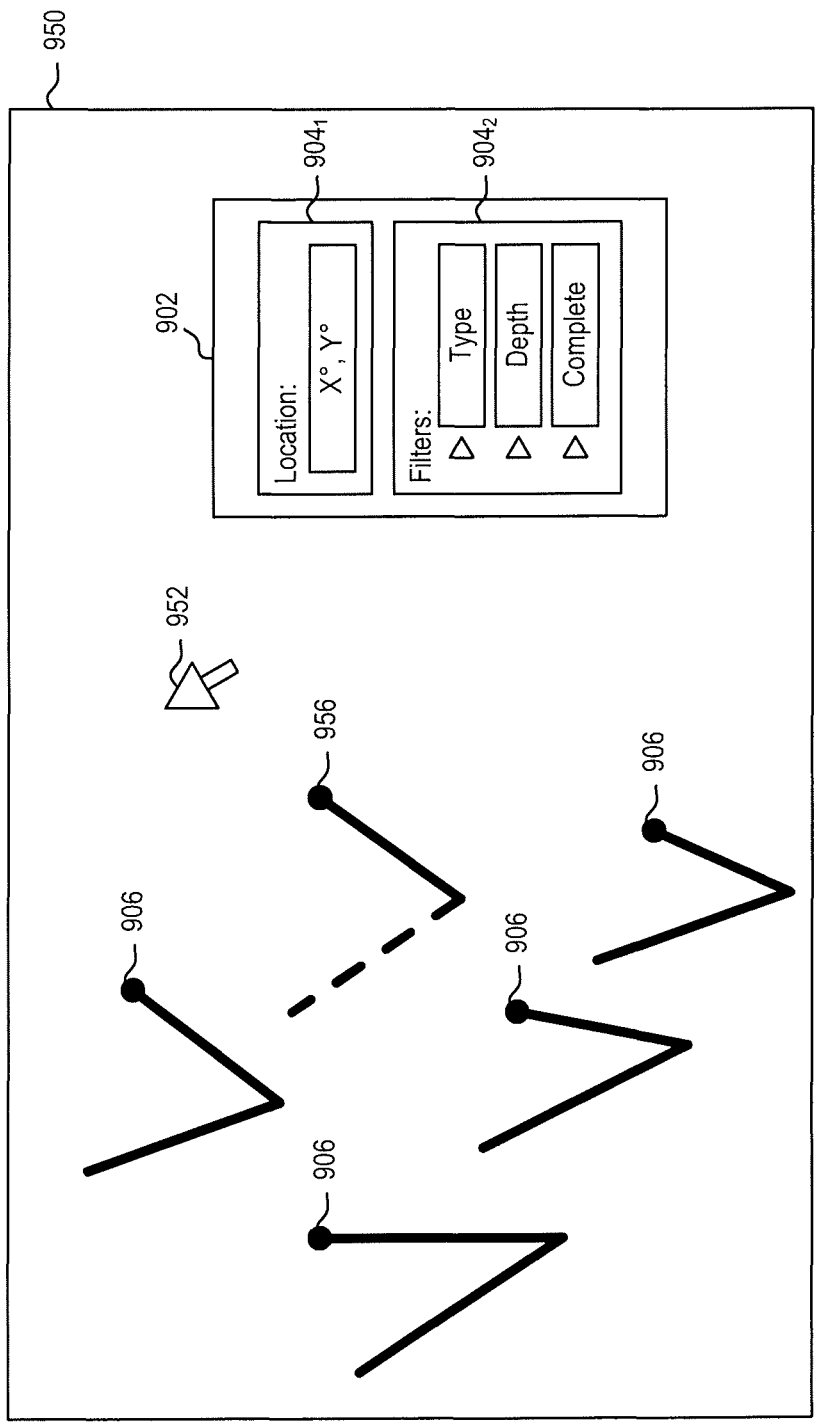
FIG. 9B is a block diagram illustrating an exemplary graphical user interface, according to example embodiments.

FIG. 9B is a block diagram illustrating a GUI 950, according to example embodiments. GUI 950 may be generated as a result of receiving input of a selection of a portion 908 (shown in FIG. 9A) of GUI 900. The input may correspond to a request to zoom into a particular portion of GUI 900. As illustrated in GUI 950, not only does well trajectory agent 108 generate a representation of where each wellbore is located in a specified location, well trajectory agent 108 is also able to generate a visual depiction of a trajectory of each wellbore. As shown, each wellbore 906 may include not only location information, but also a visualization of the wellbore's trajectory. Further, as discussed above, GUI 950 may include wellbores for which management entity 106 does not have complete information. Accordingly, wellbore trajectory agent 108 may generate complete wellbore data for incomplete wellbores. An exemplary wellbore for which complete wellbore data was generated is illustrated as wellbore 956.

Figure 10:
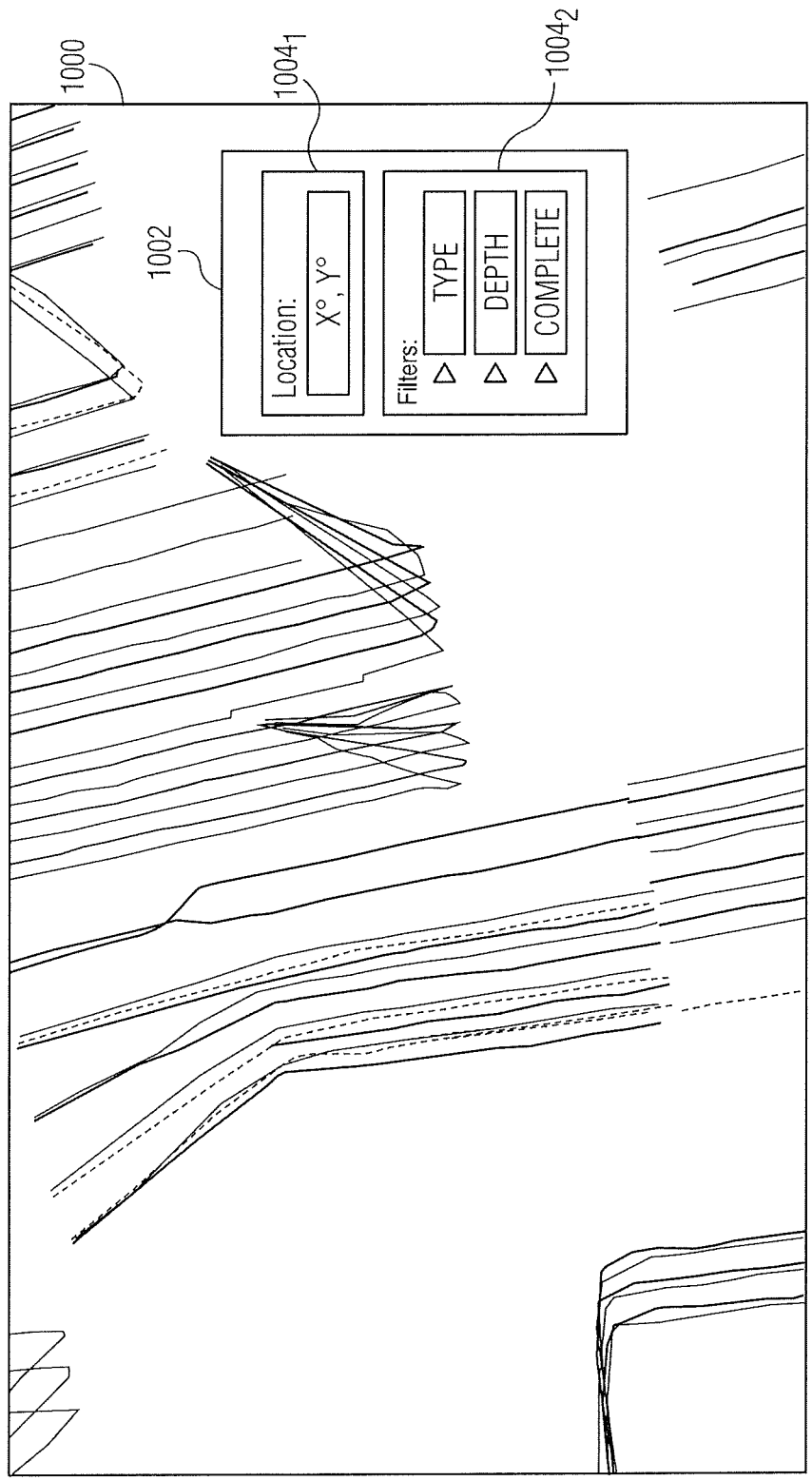
FIG. 10 is a block diagram illustrating an exemplary graphical user interface, according to example embodiments.

FIG. 10 is a block diagram illustrating a GUI 1000, according to example embodiments. GUI 1000 may include a plurality of wellbore and wellbore trajectories in a given location. For example, GUI 1000 may be a more detailed view of GUI 950 illustrated above in conjunction with FIG. 9B. As shown, GUI 1000 may allow end users to access wellbore information for a given location. GUI 1000 may include a search panel 1002 (similar to search panel 902). Search panel 1002 may be configured to receive input related to a wellbore search. As illustrated, search panel 1002 may have one or more fields $1004_1$, $1004_2$.

Field $1004_1$ may receive, as input, location information. In some embodiments, field $1004_1$ may prompt end users to provide longitudinal and latitudinal coordinates for a given location. In some embodiments, field $1004_1$ may prompt end user to provide one or more of a street, city, and state address for a given location. When provided with location information via field $1004_1$, well trajectory agent 108 may update GUI 1000 to display one or more wellbores located in the specified geographic area.

Field $1004_2$ may allow end users to set one or more constraints on the search criteria for wellbores. For example, field $1004_2$ may allow end users to constrain a wellbore search based on one or more of wellbore type, wellbore depth, completeness of the wellbore, and the like. Accordingly, after field $1004_2$ receives one or more constraints specified by the user, well trajectory agent 108 may update GUI 1000 to display one or more wellbores that satisfy such criteria.

Referring back to FIG. 9B, in some embodiments, GUI 950 (and GUI 900) may allow end users to add wellbores to a given location. For example, a user may be able to provide input to GUI 950 (e.g., right click, left click, etc. represented by cursor 952) such that wellbore trajectory agent 108 generates a wellbore trajectory given at least two or more data points corresponding to a location on GUI 950 that a user has selected. For example, wellbore trajectory agent 108 may receive the two or more data points and generate a wellbore path following the operations discussed above in conjunction with FIGS. 4, 5, and 7.

Figure 9C:
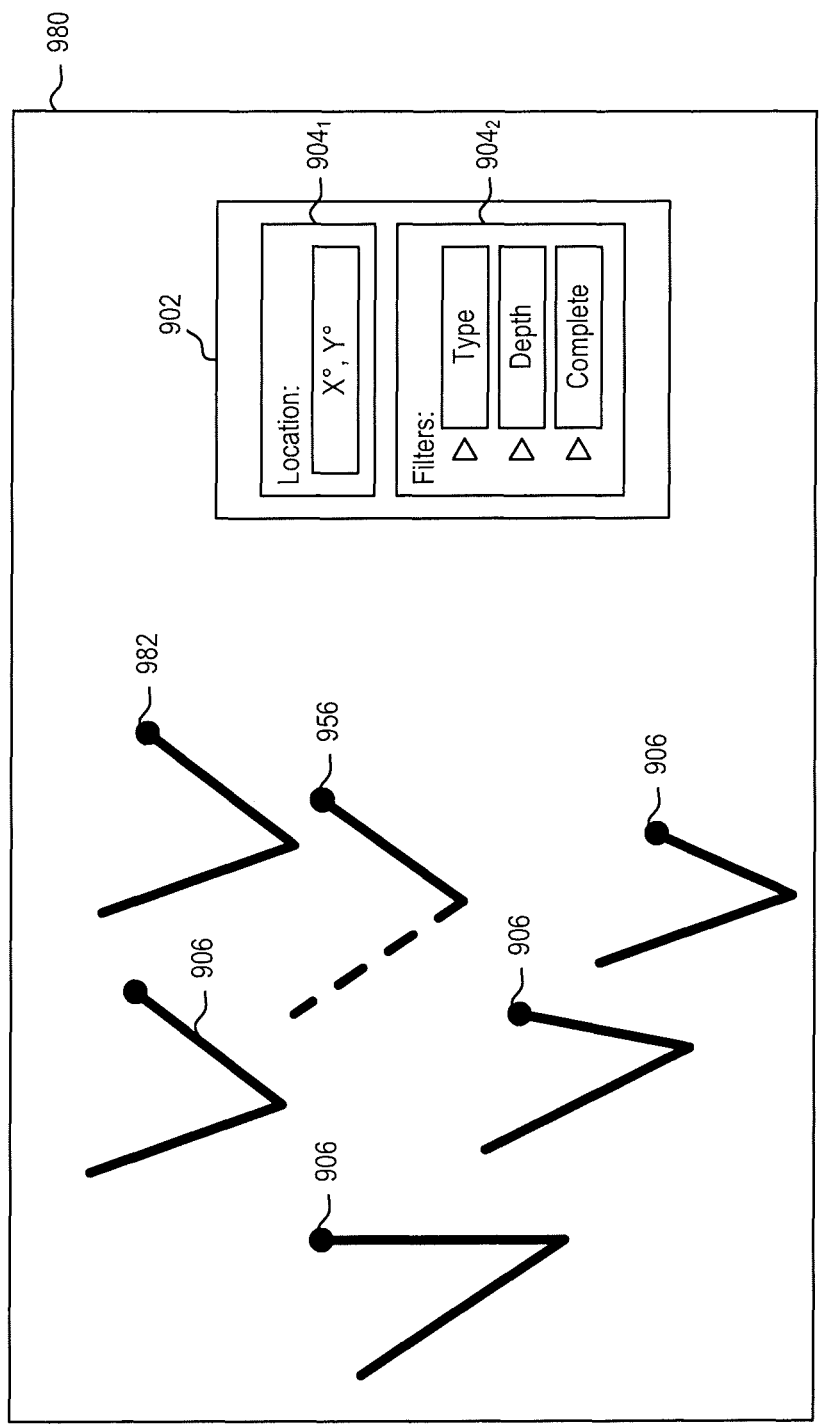
FIG. 9C is a block diagram illustrating an exemplary graphical user interface, according to example embodiments.

FIG. 9C is a block diagram illustrating a GUI 980, according to example embodiments. GUI 980 may be generated as a result of receiving input (via GUI 950) to generate a wellbore trajectory in a given location. As illustrated, new wellbore 982 may be visually depicted along with the existing wellbores 906 and 956. Accordingly, an end user may be able to identify how a wellbore fits within a specified location.

While the foregoing is directed to embodiments described herein, other and further embodiments may be devised without departing from the basic scope thereof. For example, aspects of the present disclosure may be implemented in hardware or software or a combination of hardware and software. Example embodiments described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method, comprising:
  receiving, by a computing device, one or more parameters associated with a proposed target well in a target location;
  receiving, by the computing device, two or more locational data points for the proposed target well in the target location, the two or more locational data points comprising desired top hole placement coordinates of the proposed target well and desired bottom hole placement coordinates of the proposed target well, wherein the proposed target well runs from the desired top hole placement coordinates to the desired bottom hole placement coordinates;
  generating, by the computing device, a proposed target wellbore path for an entirety of the proposed target well based on the one or more parameters associated with the proposed target well and the two or more locational data points via a trained wellbore prediction model, wherein the proposed target wellbore path extends from the desired top hole placement coordinates to the desired bottom hole placement coordinates and comprises a plurality of locational data points between the desired top hole placement coordinates and the desired bottom hole placement coordinates;
  comparing, by the computing device, each of the plurality of locational data points of the proposed target wellbore path for the proposed target well to each of a further plurality of locational data points of one or more wellbore paths of one or more wells co-located with the proposed target well in the target location;
  determining, by the computing device, that at least one locational data point of the plurality of locational data points is within a threshold distance of at least one locational data point of the further plurality of locational data points of a wellbore path of the one or more wellbore paths;
  based on the determining, generating, by the computing device, a proposed modified wellbore path for the proposed target well by adjusting the at least one locational data point of the plurality of locational data points of the proposed target wellbore path; and
  generating, by the computing device, a three-dimensional model of the target location, wherein the three-dimensional model of the target location comprises the one or more wellbore paths of the one or more wells co-located with the proposed target well and the proposed modified wellbore path for the proposed target well.

2. The method of claim 1, wherein the computing device generates the trained wellbore prediction model by:
  gathering, from one or more remote computing devices, a plurality of sets of historical wellbore information for a plurality of test wellbores;
  standardizing the plurality of sets of historical wellbore information from a first state to a second state, wherein the second state is uniform across each of the plurality of sets of historical wellbore information; and
  training a wellbore prediction model based on the standardized historical wellbore information.

3. The method of claim 2, wherein each set of the plurality of sets of historical wellbore information comprises surface hole location of each wellbore, true vertical depth of each wellbore, lateral length of each wellbore, drilling operator of each wellbore, well operator of each wellbore, geological parameters, reservoir properties, petrophysical parameters and geophysical parameters of a location in which each wellbore is located, and spacing information of each wellbore.

4. The method of claim 2, wherein gathering the plurality of sets of historical wellbore information for the plurality of test wellbores, comprises:
  determining that a set of the plurality of sets of historical wellbore information is incomplete; and
  completing the incomplete set of the plurality of sets of historical wellbore information.

5. The method of claim 1, wherein the one or more parameters associated with the proposed target well comprises projected hole location, projected true vertical depth, projected lateral length, projected drilling operator, projected well operator, projected geological parameters, projected reservoir properties, projected petrophysical parameters, projected geophysical parameters, and projected spacing information.

6. The method of claim 1, wherein the one or more parameters associated with the proposed target well comprises incomplete wellbore path data associated with the proposed target well.

7. The method of claim 1, further comprising:
adding the modified wellbore path into the target location; and
generating a production prediction for the target location based on adding the modified wellbore path.

8. The method of claim 7, further comprising:
associating the production prediction with a reward amount;
determining that the reward amount is greater than zero; and
generating a second proposed target wellbore path using the target location with the modified wellbore path.

9. A system, comprising:
a processor; and
a memory having programming instructions stored thereon, which, when executed by the processor, causes the system to perform operations comprising:
receiving one or more parameters associated with a proposed target well in a target location;
receiving two or more locational data points for the proposed target well in the target location, the two or more locational data points comprising desired top hole placement coordinates of the proposed target well and desired bottom hole placement coordinates of the proposed target well, wherein the proposed target well runs from the desired top hole placement coordinates to the desired bottom hole placement coordinates a;
generating a proposed target wellbore path based on the one or more parameters associated with the proposed target well and the two or more locational data points via a trained wellbore prediction model, wherein the proposed target wellbore path extends from the desired top hole placement coordinates to the desired bottom hole placement coordinates and comprises a plurality of locational data points between the desired top hole placement coordinates and the desired bottom hole placement coordinates;
comparing each of the plurality of locational data points of the proposed target wellbore path for the proposed target well to each of a further plurality of locational data points of one or more wellbore paths of one or more wells co-located with the proposed target well in the target location;
determining that at least one locational data point of the plurality of locational data points is within a threshold distance of at least one locational data point of the further plurality of locational data points of a wellbore path of the one or more wellbore paths;
based on the determining, generating a modified wellbore path for the proposed target well by adjusting the at least one locational data point of the plurality of locational data points of the proposed target wellbore path; and
generating a three-dimensional model of the target location, wherein the three-dimensional model of the target location comprises the one or more wellbore paths of the one or more wells co-located with the proposed target well and the modified wellbore path for the proposed target well.

10. The system of claim 9, wherein the operations further comprise:
generating the trained wellbore prediction model by:
gathering, from one or more remote computing devices, a plurality of sets of historical wellbore information for a plurality of test wellbores;
standardizing the plurality of sets of historical wellbore information from a first state to a second state, wherein the second state is uniform across each of the plurality of sets of historical wellbore information; and
training a wellbore prediction model based on the standardized historical wellbore information.

11. The system of claim 10, wherein each set of the plurality of sets of historical wellbore information comprises surface hole location of each wellbore, true vertical depth of each wellbore, lateral length of each wellbore, drilling operator of each wellbore, well operator of each wellbore, geological parameters, reservoir properties, petrophysical parameters and geophysical parameters of a location in which each wellbore is located, and spacing information of each wellbore.

12. The system of claim 10, wherein gathering the plurality of sets of historical wellbore information for the plurality of test wellbores, comprises:
determining that a set of the plurality of sets of historical wellbore information is incomplete; and
completing the incomplete set of the plurality of sets of historical wellbore information.

13. The system of claim 9, wherein the one or more parameters associated with the proposed target well comprises incomplete wellbore path data associated with the proposed target well.

14. The system of claim 9, wherein the operations further comprise:
adding the modified wellbore path into the target location; and
generating a production prediction for the target location based on adding the modified wellbore path.

15. The system of claim 14, wherein the operations further comprise:
associating the production prediction with a reward amount;
determining that the reward amount is greater than zero; and
generating a second proposed target wellbore path using the target location with the modified wellbore path.

16. A non-transitory computer readable medium having instructions stored thereon, which, when executed by a processor, cause the processor to perform a method, comprising:
receiving, by a computing device, one or more parameters associated with a proposed target well in a target location;
receiving, by the computing device, two or more locational data points for the proposed target well in the target location, the two or more locational data points comprising desired top hole placement coordinates of the proposed target well and desired bottom hole placement coordinates of the proposed target well, wherein the proposed target well runs from the desired top hole placement coordinates to the desired bottom hole placement coordinates;

generating, by the computing device, a proposed target wellbore path based on the one or more parameters associated with the proposed target well and the two or more locational data points via a trained wellbore prediction model, wherein the proposed target wellbore path extending from the desired top hole placement coordinates to the desired bottom hole placement coordinates and comprises a plurality of locational data points between the desired top hole placement coordinates and the desired bottom hole placement coordinates;

comparing each of the plurality of locational data points of the proposed target wellbore path for the proposed target well to each of a further plurality of locational data points of one or more wellbore paths of one or more wells co-located with the proposed target well in the target location;

determining, by the computing device, that at least one locational data point of the plurality of locational data points is within a threshold distance of at least one locational data point of the further plurality of locational data points of a wellbore path of the one or more wellbore paths;

based on the determining, generating, by the computing device, a modified wellbore path for the proposed target well by adjusting the at least one locational data point of the plurality of locational data points of the proposed target wellbore path; and generating, by the computing device, a three-dimensional model of the target location, wherein the three-dimensional model of the target location comprises the one or more wellbore paths of the one or more wells co-located with the proposed target well and the modified wellbore path for the proposed target well.

17. The non-transitory computer readable medium of claim 16, further comprising:
generating the trained wellbore prediction model by:
gathering, from one or more remote computing devices, a plurality of sets of historical wellbore information for a plurality of test wellbores;
standardizing the plurality of sets of historical wellbore information from a first state to a second state, wherein the second state is uniform across each of the plurality of sets of historical wellbore information; and
training a wellbore prediction model based on the standardized historical wellbore information.

18. The non-transitory computer readable medium of claim 16, further comprising:
adding the modified wellbore path into the target location;
generating a production prediction for the target location based on adding the modified wellbore path;
associating the production prediction with a reward amount;
determining that the reward amount is greater than zero; and
generating a second proposed target wellbore path using the target location with the modified wellbore path.

\* \* \* \* \*